United States Patent
Zhang et al.

(10) Patent No.: US 9,232,256 B2
(45) Date of Patent: Jan. 5, 2016

(54) SYSTEM AND METHOD FOR GENERATING FLASH-BASED MEDIA STREAM

(75) Inventors: Zhihua Zhang, Shenzhen (CN); Sa Xiao, Shenzhen (CN); Dong Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 505 days.

(21) Appl. No.: 13/576,841

(22) PCT Filed: Mar. 2, 2011

(86) PCT No.: PCT/CN2011/071461
§ 371 (c)(1),
(2), (4) Date: Aug. 2, 2012

(87) PCT Pub. No.: WO2011/134310
PCT Pub. Date: Nov. 3, 2011

(65) Prior Publication Data
US 2013/0042017 A1   Feb. 14, 2013

(30) Foreign Application Priority Data
Apr. 27, 2010   (CN) .......................... 2010 1 0166737

(51) Int. Cl.
*H04L 29/06*   (2006.01)
*H04N 21/258*   (2011.01)
(Continued)

(52) U.S. Cl.
CPC ......... *H04N 21/41407* (2013.01); *H04H 20/95* (2013.01); *H04L 65/1043* (2013.01); *H04L 65/4084* (2013.01); *H04L 65/4092* (2013.01); *H04L 65/602* (2013.01); *H04N 21/25825* (2013.01); *H04N 21/6377* (2013.01)

(58) Field of Classification Search
CPC ... H04L 7/0337; H04L 67/28; H04L 65/1043; H04L 65/4084; H04L 65/4092; H04L 65/602; H04N 21/41407; H04N 21/25825; H04N 21/6377; H04H 20/95
See application file for complete search history.

(56) References Cited

U.S. PATENT DOCUMENTS 7,783,171 B2 *   8/2010   Ito .................................. 386/241
8,694,668 B2 *   4/2014   Dhuse et al. ................... 709/231
(Continued)

FOREIGN PATENT DOCUMENTS

CN   1573808 A   2/2005
CN   1852431 A   10/2006
(Continued)

OTHER PUBLICATIONS

International Search Report for PCT/CN2011/071461 dated May 16, 2011.

*Primary Examiner* — Uzma Alam
(74) *Attorney, Agent, or Firm* — Ling Wu; Stephen Yang; Ling and Yang Intellectual Property (57) ABSTRACT

A system and method for playing Flash-based media are disclosed in the present invention. The method comprises that: when a Flash conversion server receives a Flash play request sent from a media server, it parsing the request, if the Flash play request is a dynamic Flash request or a real-time Flash request, the Flash conversion server converting the Flash file that is requested to be played into code stream data, and pushing the code stream data to the media server; and the media server playing the received code stream data to the terminal. With the technical solution in the present invention, the Flash animation can be converted and played to a terminal in real time.

6 Claims, 3 Drawing Sheets (51) Int. Cl.
*H04N 21/6377* (2011.01)
*H04N 21/414* (2011.01)
*H04H 20/95* (2008.01)

(56) References Cited

U.S. PATENT DOCUMENTS 8,782,066 B2 * 7/2014 English et al. ............... 707/758
8,806,320 B1 * 8/2014 Abdo ........................... 715/203
8,855,460 B2 * 10/2014 Lussier et al. ................ 386/200
8,910,208 B2 * 12/2014 Hartman et al. ............... 725/41
8,954,976 B2 * 2/2015 Gerovac et al. ............... 718/104

FOREIGN PATENT DOCUMENTS

CN 101060447 A 10/2007
CN 101521820 A 9/2009

* cited by examiner

SYSTEM AND METHOD FOR GENERATING FLASH-BASED MEDIA STREAM

TECHNICAL FIELD

The present invention relates to the field of intelligent network technology, and more especially, to a system and method for generating Flash-based media code stream.

BACKGROUND OF THE RELATED ART

Flash is an excellent animation design software released by the Adobe company. It is an interactive animation design tool, and it can integrate music, sound, animation and innovative interface together to produce high-quality vector animation. Flash is the most popular animation work (such as a variety of dynamic web pages, LOGOS, advertisements, MTV, games and high-quality courseware, and so on) design tool on the Internet today, and the Flash animation has become the interactive vector animation standard in fact.

In the traditional intelligent network technology, the customer service system generally is voice-centric. With the advancement of the communication technology, we have now entered into 3G era, with the growing popularity of visual terminals, the video customer service system is an important element to enhance the competitiveness of the operators.

In the existing video customer service system, the video service applications are relative scarce, the traditional video service usually provides and achieves the specified video content, while the video content dynamically generated as desired is generally achieved by using the video overlap or text overlap. Because it is stiff overlay, the perception for the end customer is relatively poor.

In the existing video customer service system, another bottleneck is that the video sources are relatively scarce, and there is not a simple and convenient media server system to provide video services; moreover, even if there is the media server system, there relatively lacks personnel mastering in video production. Therefore, in view of the performance, most national operators' customer video services currently are not launched properly.

The Flash animation design is easy, a considerable number of graphic designers have mastered the Flash animation design; the Flash animation can be dynamically displayed according to the parameters, thus it is relatively good at completing the functions such as displaying the menu and data of a large amount of applications in the video customer service. Therefore, using the Flash animation as the customer service video source is a very good method. However, although in the related art, the Flash animation can be converted to audio and video files, the dynamic Flash and real-time Flash play request cannot be accomplished.

SUMMARY OF THE INVENTION

The technical problem to be solved in the present invention is to provide a system and method for playing Flash-based media to convert and play the Flash animation to the terminal in real time.

The present invention provides a method for playing Flash-based media, comprising:

a Flash conversion server parsing the request when receiving a Flash Play request sent by a media server, if the Flash Play request is a dynamic Flash request or a real-time Flash request, the Flash conversion server converting the Flash file that is requested to be played into code stream data and pushing the code stream data to the media server, the media server playing the received code stream data to the terminal.

Preferably, the Flash conversion server sends a code stream pushing identifier to said media server before pushing the code stream data to the media server, the Flash conversion server carries the code stream pushing identifier when it pushes the code stream data to the media server, and said media server identifies the code stream data corresponding to this request according to the code stream pushing identifier.

Preferably, when the Flash play request is a dynamic Flash request, if the Flash conversion server does not store the code stream file corresponding to the Flash file that is requested to be played but stores said Flash file, the Flash conversion server converts the Flash file into the code stream data and pushes the code stream data to the media server.

Preferably, after the Flash file conversion is completed, the Flash conversion server also generates a code stream file with all the code stream data corresponding to the Flash file and stores the code stream file, and adds a Flash code stream corresponding item into a stored Flash code stream conversion corresponding table, the Flash code stream corresponding item comprises the Flash file path, the code stream file path, the requested Flash animation parameters, the conversion time, the inquiry time, and the number of inquiries.

Preferably, when the Flash Play request is a real-time Flash request, if the Flash conversion server stores the Flash file, the Flash conversion server converts the Flash file to code stream data and pushes the code stream data to the media server.

Preferably, when the Flash Play request is a dynamic Flash request, the Flash Play request comprises the Flash file path and the Flash animation parameters;

According to the Flash file path and the Flash animation parameters in the request, said Flash conversion server first finds whether the corresponding code stream file exists in the Flash code stream conversion corresponding table or not, if yes, returns the code stream file path to the media server, and said media server obtains the corresponding code stream file according to the code stream file path and plays the corresponding code stream file to the terminal.

Preferably, when the dynamic Flash file in the Flash code stream corresponding item is requested, the Flash conversion server updates the inquiry time and the number of inquiries of the Flash code stream corresponding item, and periodically deletes the Flash code stream corresponding item whose inquiry times is fewer than a default value or deletes one or more of the Flash code stream corresponding items whose inquiry times is at the bottom of the list.

The present invention also provides a system for playing Flash-based media, comprising a Flash conversion server connected to a media server; said Flash conversion server is set to: receive and parse a Flash Play request sent by the media server, and when the Flash play request is a dynamic Flash request or a real-time Flash request, the Flash file that is requested to be played is converted into code stream data and returned to said media server.

Preferably, the Flash conversion server comprises a request processing module, a conversion management module, a Flash conversion module, a storage module and a code stream pushing module;

said storage module is set to: store Flash files and code stream files;

said conversion management module is set to: before the code stream pushing module pushes the code stream data to the media server, send a code stream pushing identifier to the media server through the request processing module, send a pushing port and the code stream pushing identifier to the code stream pushing module, and send a dynamic Flash conversion request including the Flash file path to the Flash conversion module;

said Flash conversion module is set to: after receiving said dynamic Flash conversion request, convert the corresponding Flash file into code stream data and send the code stream data to the code stream pushing module;

said code stream pushing module is set to: after receiving the code stream data, push the code stream data carrying the code stream push identifier to the media server from said pushing port.

Preferably, said request processing module is set to: parse the Flash play request, and send the parsed Flash request to the conversion management module;

said conversion management module is set to: when the Flash play request is a dynamic Flash request and when the storage module does not store the code stream file corresponding to the Flash file but stores the Flash file, send a dynamic Flash conversion request to the Flash conversion module.

Preferably, the request processing module is set to: parse the Flash play request, and send the parsed Flash request to the conversion management module;

the conversion management module is set to: when the Flash play request is a real-time Flash request and when the Flash file is stored in the storage module, send a dynamic Flash conversion request to the Flash conversion module.

Preferably, the storage module is also set to: store the Flash code stream conversion corresponding table;

said dynamic Flash conversion request also comprises a code stream file writing-in instruction and a result sending-back instruction;

said Flash conversion module is also set to: when said Flash files conversion is complete, generate a code stream file with all the code stream data corresponding to the Flash file and store the code stream file to the storage module, and return a conversion complete response to the conversion management module, wherein the dynamic Flash conversion request contains the Flash file path, the code stream file path, and the Flash animation parameters;

said conversion management module is set to: add a Flash code stream corresponding item into the Flash code stream conversion corresponding table stored in the storage module, wherein the recorded item comprises the Flash file path, the code stream file path, the requested Flash animation parameters, the conversion time, the inquiry time and the number of inquiries.

Preferably, when the Flash play request is a dynamic Flash request, the Flash play request comprises the Flash file path and the Flash animation parameters;

said conversion management module is also set to: find whether there exists a corresponding code stream file in the Flash code stream conversion corresponding table or not according to the Flash file path and the Flash animation parameters in the request, and when the storage module stores a code stream file consistent with the Flash file path and the Flash animation parameters, return the code stream file path to the media server through the request processing module;

the media server is also set to: obtain the code stream file corresponding to the code stream file path and play the code stream file to the terminal.

Preferably, the conversion management module is also set to: when the dynamic Flash file in the Flash code stream corresponding item is requested, update the query time and the number of inquiries of the Flash code stream corresponding item, and periodically delete the Flash code stream corresponding item whose query times is fewer than a default value or delete one or more of the Flash code stream corresponding items whose number of inquiries is at the bottom of the sorting list.

In summary, the present invention provides a system and method for playing Flash-based media, the operators can provide users with video service-based customer service system or other applications, since the Flash design is simple and mature, it solves the problem that the video sources are scarce in the conventional video service system and solves the problem that dynamic video perception in the conventional video service system is poor. Through the deployment of the system, the operators can reduce their operating costs, thus the method has good promotion prospects. With this solution, the Flash animation can be converted and played to the terminal in real time, thus improving the user experience.

PREFERRED EMBODIMENTS OF THE PRESENT INVENTION

The present invention provides a system and method for playing Flash-based media, based on the application of this system, a wealth of video sources, which are currently scarce, can be provided as for the 3G video source.

Figure 1:
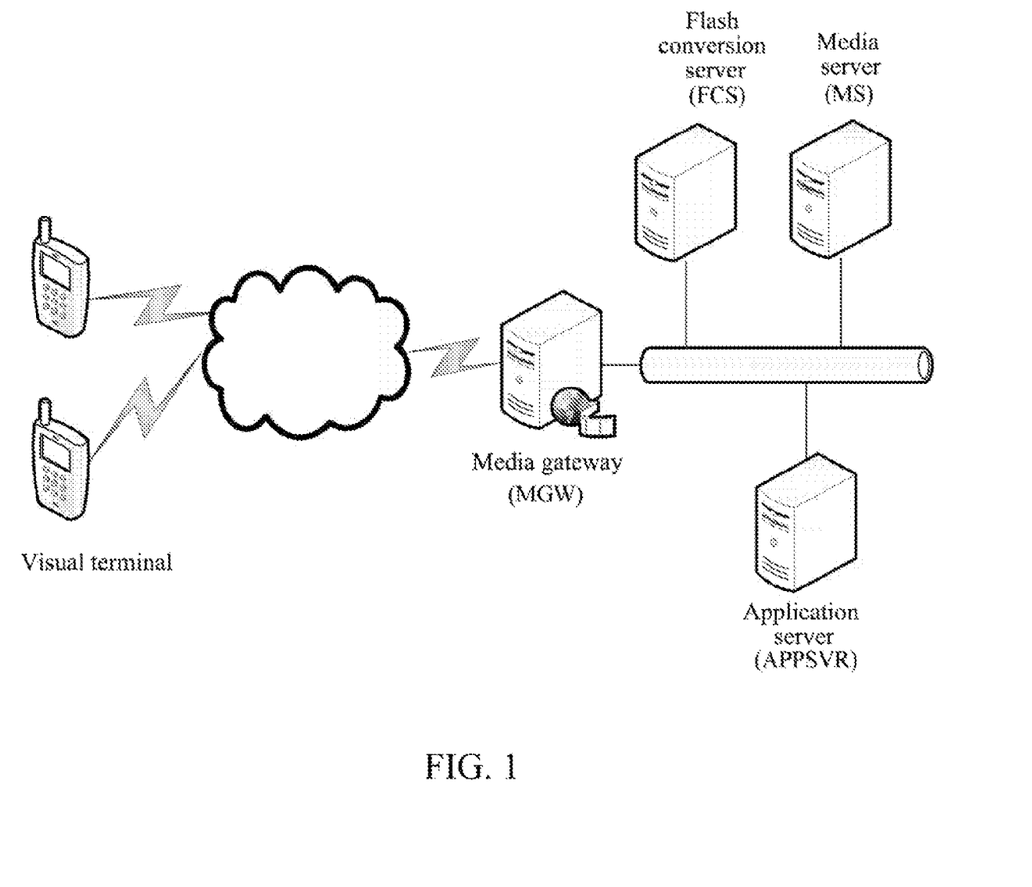
FIG. 1 is a diagram of the system network architecture specifically implemented in the certain embodiment of the invention.

This embodiment provides a system for playing Flash-based media, as shown in FIG. 1, comprising a terminal, a media gateway, an application server (APPSVR), a Media Server (MS) and a Flash conversion server (FCS);

the media gateway is used to make the terminal access to the intelligent network;

the application server (APPSVR) is used to implement the intelligent network service logic;

the Media Server (MS) is used to receive and process commands from the application server, and is responsible for establishing a real-time transport protocol (RTP) connection with the terminal, it is also used to send the Flash play request to the FCS, and receive the code stream data returned by the FCS to play to the terminal, it is also used to receive the code stream file path returned by the FCS, obtain the corresponding code stream file according to the code stream data path, and play the code stream file to the terminal.

The terminal is a video terminal device that can make video calls, such as: a 3G mobile phone, a video phone, and so on.

The Flash conversion server (FCS) is used to receive and parse the Flash play request sent by the media server, when the Flash play request is a dynamic Flash request or a real-time Flash request, convert the Flash file that is requested to be played to code stream data and return the code stream data to the media server. Also, it is used to allow the local code stream file system to be read by the MS through a sharing way; the MS and the FCS are connected through the TCP/IP protocol, the FCS monitors at the command port, receives the MS connection and request, after a successful registration, the FCS actively establishes and maintains a code stream pushing connection with the MS. The FCS can establish connections to multiple MSs.

Figure 2:
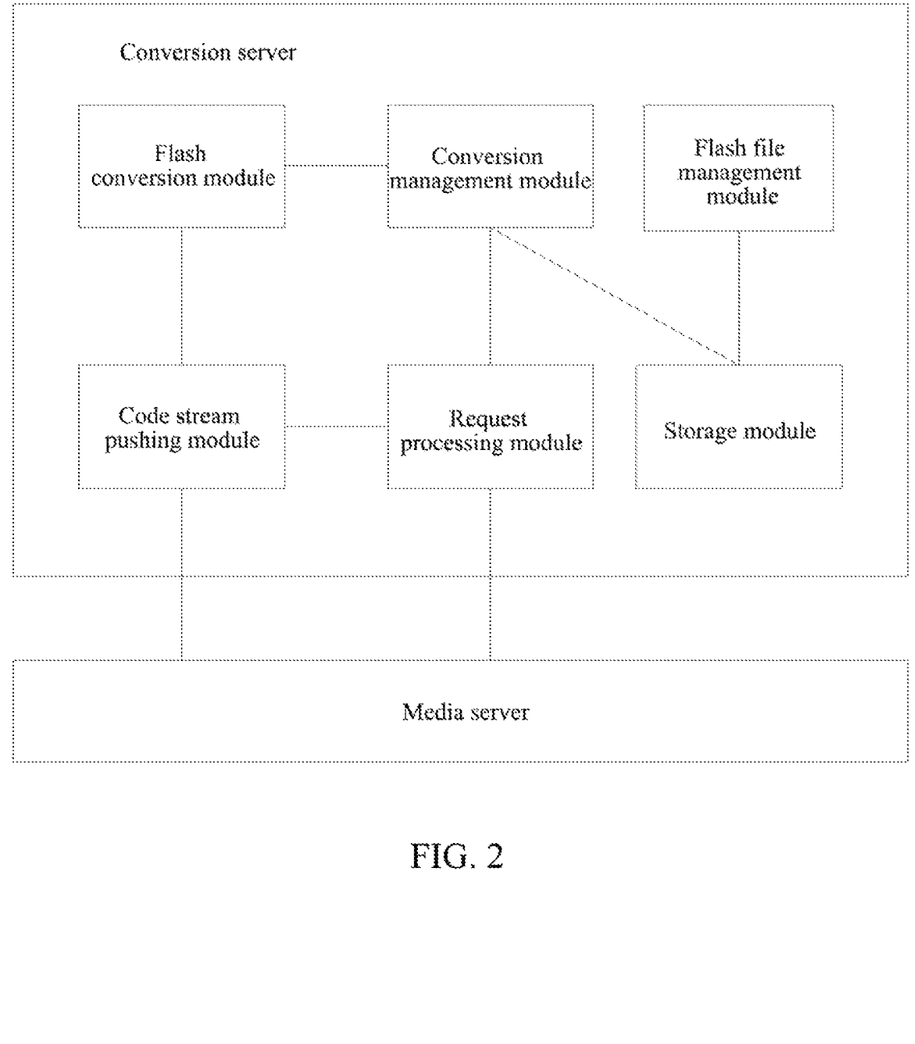
FIG. 2 is a schematic diagram of the Flash conversion server structure in the certain embodiment of the invention.

As shown in FIG. 2, the Flash conversion server (FCS) in the certain embodiment of the invention comprises the request processing module, the conversion management module, the Flash conversion module, the code stream pushing module, the storage module and the Flash file management module;

First, the concept of Flash Category in this system is briefly elaborated, the Flash animations can be divided into the static Flash, the dynamic Flash and the real-time Flash in accordance with the request form: the static Flash means that the animation content is fixed and the Flash animation has a fixed duration, such as the operator's welcome animation; the dynamic Flash means that the animation content can change with the change of the request parameters and the Flash animation has a fixed duration, such as menus and billing information; the real-time Flash means that the animation content is not fixed and there is no fixed duration, such as online Flash games.

In the following, the function of each module will be described in detail:

the request processing module is used to receive and parse a request sent by the MS, and send the parsed Flash request to the conversion management module, it is also used to receive the code stream file path returned by the conversion management module and forward the path to the MS, and after receiving the response sent by the conversion management module indicating that the file is found, forward the response to the MS.

The request processing module is also used to establish a connection between the FCS and the MS according to the port provided in the request, the connection might be a TCP/IP connection, and thereafter, the FCS pushes the generated code stream to the MS through said connection.

The request processing module is also used to receive a pushing stop command sent by the MS, forward the command to the conversion management module, wherein the pushing stop command contains the code stream pushing ID.

The conversion management module is used to receive the Flash request, and process according to the request type; specifically, when the Flash request is a static Flash request, find whether there is the corresponding Flash code stream corresponding item (FS) in the Flash code stream conversion corresponding table (FST) or not according to the Flash file path in the request, if yes, send a response carrying the code stream file path to the request processing module, otherwise, if not, send a response indicating that the Flash file is not found to the request processing module; when the Flash request is a dynamic Flash request or a real-time Flash request, if it is determined that it needs to push the code stream data to the media server, the conversion management module is used to send a code stream push ID to the media server through the request processing module before the code stream pushing module pushes the code stream data to the media server, the conversion management module is also used to send the pushing port and the code stream pushing ID to the code stream pushing module and send a dynamic Flash conversion request to the Flash conversion module, the request comprises the Flash file path; said pushing port and the code stream pushing ID might be sent directly by the conversion management module to the code stream pushing module, or the pushing port and the code stream pushing ID might be contained in the dynamic Flash conversion request to be sent by the Flash converter module to the code stream pushing module along with the converted code stream data.

When the Flash request is a dynamic Flash request, firstly, the conversion management module finds whether there is a corresponding code stream file (that is, the FS) in the FST or not by taking the Flash File path and the Flash animation parameters in the request as the keywords, if the corresponding FS item is found, sends a response carrying the code stream file path to the request processing module, and updates the recorded inquiry time and the number of inquiries corresponding to the keywords (parameter and the file path) of the FST, otherwise, finds whether the storage module has the Flash files in the request or not, if not, sends a response indicating that the Flash file is not found to the request processing module, otherwise, determines that it needs to perform the code stream pushing;

when the Flash request is a real-time Flash request, the conversion management module finds whether the storage module has the Flash file in the request or not according to the Flash file path in the request, if not, sends a response indicating that the Flash file is not found to the request processing module, otherwise, determines that it needs to perform the code stream pushing;

when the Flash request is a dynamic Flash request, the dynamic Flash conversion request sent by the conversion management module might also comprise the code stream file writing-in instruction and the result sending-back instruction, and so on.

The conversion management module is also used to return a response indicating that the Flash file is not found to the request processing module when the storage module does not store the Flash file that is requested to be played.

The conversion management module is also used to, after receiving the conversion complete response, add a FS in the FST stored in the storage module, wherein, the FS comprises the Flash file path, the code stream file path, the requested Flash animation parameters, the conversion time, the inquiry time, the number of inquiries, and so on.

The conversion management module is also used to maintain the stored code stream file, specifically, since the requested Flash animation parameters are ever-changing, the code stream file request generated by some dynamic Flash requests has a low hit rate and the restriction of limited disk space, in accordance with the sorting of the hit rates, delete the code stream files with low hit rates, while for the code stream files that are often requested, enhance their hit rates.

The conversion management module is also used to forward the pushing stop command sent by the request processing module to the code stream pushing module.

The conversion management module is also used to send a static Flash conversion request to the Flash conversion module after receiving the pre-conversion request sent by the Flash file management module, wherein the request comprises the Flash file path; and add a FS in the FST in the storage module after receiving the static Flash conversion complete response, wherein the FS contains the Flash file path and the code stream file path.

The conversion management module might also be used to, when the dynamic Flash file in the Flash code stream corresponding item is requested, update the inquiry time and the number of inquiries of the FS, and periodically delete the FS whose number of inquiries is fewer than a default value or delete one or more of the FSs whose number of inquiries is of last in a sequence.

The Flash conversion module is used to, after receiving the dynamic Flash conversion request sent by the conversion management module, get the Flash file from the storage module according to the Flash file path in the request, convert the Flash file to code stream data, and send the pushing port, the code stream pushing ID and the converted code stream data to the code stream pushing module. The Flash conversion module is also used to generate all the code stream data corresponding to the Flash file into a code stream file and store the file to the storage module when the dynamic Flash conversion request comprises the code stream file writing-in instruction and the result sending-back instruction, and return a conversion complete response to the conversion management module, the request contains the Flash file path, the code stream file path, the Flash animation parameters, and so on.

The Flash conversion module is used to convert the Flash animation into audio and video code streams. When this conversion function is used to play Flash animation, the screen is captured termly to generate a picture in YUV data format, the sound data of the Flash player are sampled to generate audio data. During the playing process, audio and video code streams of H.263 is generated with the generated images and audio data in real time.

The Flash conversion module is also used to convert the corresponding Flash file to a code stream file and store it to the storage module after receiving a static Flash conversion request sent by the conversion management module, return a static Flash conversion complete response to the conversion management module, the response comprises the Flash file path and the code stream file path. The generated code stream file might be a single file, such as the 3GP file, or two audio and video code stream files, the specific number of the code stream files can be configured according to the external system requirements.

The Flash conversion module comprises multiple conversion processing units (that is, multiple threads or processes) and can process multiple conversion requests simultaneously.

The code stream pushing module is used to push the received Flash code stream carrying the code stream pushing ID to the MS from the corresponding pushing port, and stop pushing the code stream to the MS after receiving the pushing stop command sent by the conversion management module.

The code stream pushing module maintains a code stream pushing thread with each MS, the thread cyclically detects the MS code stream link list termly, if new code stream data belonging to the MS are found, the code stream data are sent to the corresponding MS. The code streams of the same MS form a code stream link list.

The storage module is used to store the Flash animation source files (that is, the Flash files), the Flash files are divided into static Flash and dynamic Flash in accordance with whether the animation content supports the parameters or not, that is, a Flash animation with fixed animation content is the static Flash, and a Flash animation whose animation content can change with the parameters is the dynamic flash, the dynamic and static Flashes are distinguished with their file extensions.

The storage module is also used to generate the code stream file and the Flash code stream conversion corresponding table (FST), the FST comprises the static Flash's FS and the dynamic Flash's FS, the static Flash's FS records the Flash file path and the code stream file path, and the dynamic Flash's FS records the Flash file path, the code stream file path, the requested Flash animation parameters, the conversion time, the inquiry time and the number of inquiries.

The Flash file management module scans the Flash file in the storage module termly, comprising the following operations:

a if a new static Flash is found, sending a pre-conversion request to the conversion management module, wherein only the static Flash whose pre-conversion is completed can be released.

b. If a dynamic Flash update is found, deleting the converted code stream file corresponding to the dynamic Flash, and deleting the corresponding FS in the FST.

c If it is found that a Flash file is deleted, deleting the corresponding code stream file, and deleting the corresponding FS in the FST.

This embodiment provides a method for playing Flash-based media, when a Flash conversion server receives and parses a Flash play request sent by a media server, if the Flash play request is a dynamic Flash request or a real-time Flash request, the Flash conversion server converts a Flash file that is requested to be played into code stream data and pushes the code stream data to the media server, the media server plays the received data code stream to a terminal.

First, the service provider writes down a video business logic and publishes it to the application server, uses the Flash development tool to design the Flash animation and deploys it to the FCS;

afterwards, when the user requests to play the Flash, the following steps are executed:

step 1: the user uses the visual terminal to dial the access code of the video service, and soft-switching triggers the video service to the APPSVR;

step 2: the APPSVR sends a link creation request to the MS to establish an RTP connection between a visual terminal and the MS;

step 3: the APPSVR sends the Flash play request to the MS, the MS sends a Flash play request to the FCS, the FCS parses the Flash play request, and further processes according to the request type, and then returns a response to the MS, the response might be the code stream file path, the code stream data, or a response indicating that file is not found.

Step 4: the MS responds to the terminal according to the received response, specifically, when the response is the code stream file path, the MS obtains the corresponding code stream file from the FCS according to the code stream file path and sends the code stream to the terminal through the RTP connection, that is, plays the code stream to the terminal, when the response is code stream data, the MS synchronously plays the received code stream data to the terminal, when the response is that the file is not found, the MS returns the request failed response to the terminal.

Step 5: the service is played completely, the APPSVR sends a link disconnection request to the MS, and the MS cuts the RTP connection with the visual terminal.

Figure 3:
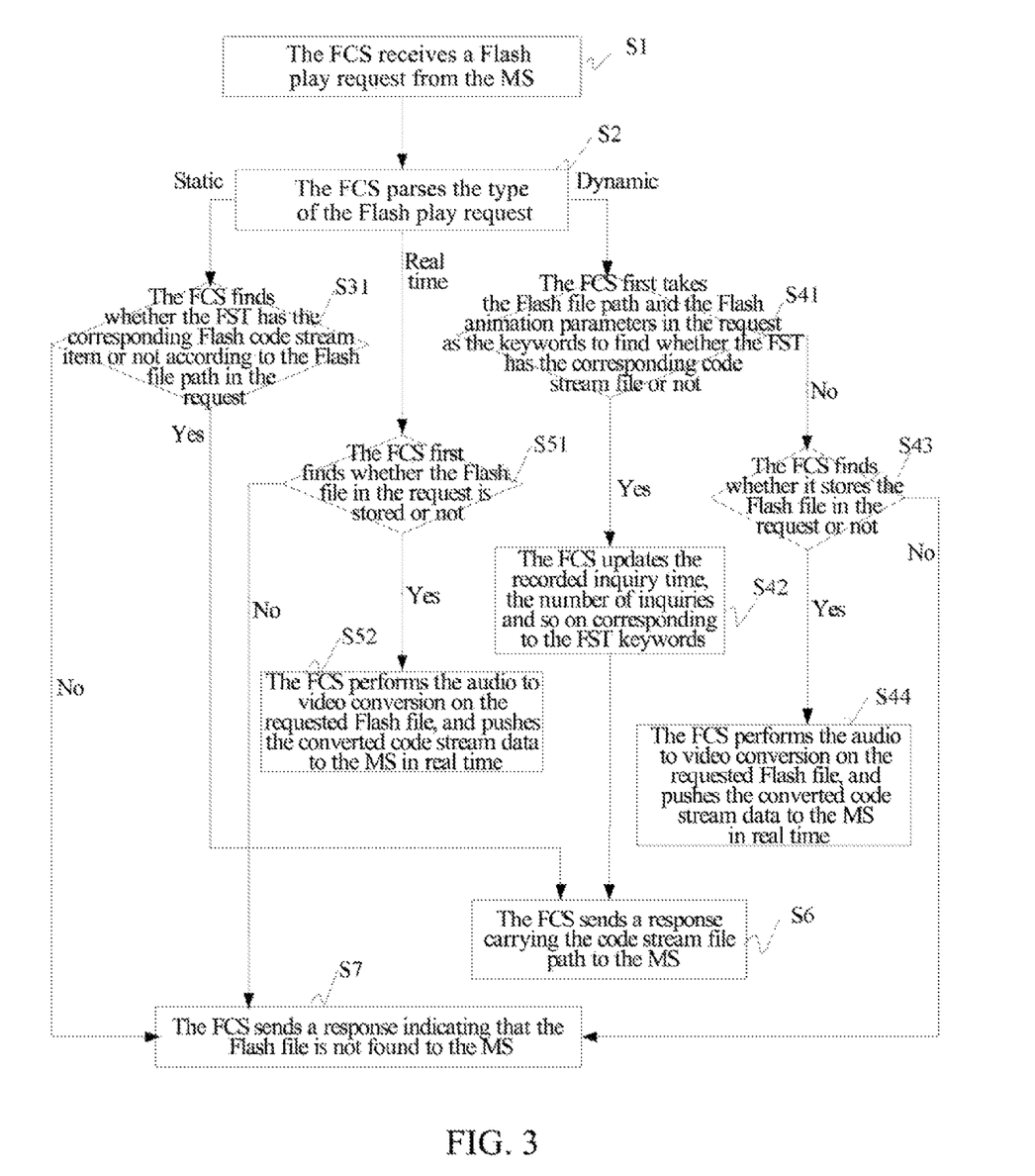
FIG. 3 is a flow chart of the method for playing Flash-based media in the certain embodiment of the invention.

In the following, the step 3 in the aforementioned embodiment will be described with combination of the accompanying FIG. 3:

S1: the FCS receives a Flash play request from the MS, the request comprises the Flash file path, when the request is a dynamic Flash request, it also comprises the Flash animation parameters, and when the request is a real-time Flash request, it also includes a real-time flag;

S2: the FCS parses the type of the Flash play request;

specifically, if the request only has the Flash file path, it is a static Flash request, if the request carries the Flash animation parameters, it is a dynamic Flash request, if the real-time flag in the request is true, it is a real-time Flash request; afterwards, it is to process according to the request type, when the type is the static Flash request, it is to proceed to step S31, when the type is the dynamic Flash request, it is to proceed to step S41, and when the type is the real-time Flash request, it is to proceed to step S51;

S31: the FCS finds whether the Flash code stream conversion corresponding table (FST) has the corresponding Flash code stream item (FS) or not according to the Flash file path in the request, if yes, it is to proceed to step S6, otherwise it is to proceed to step S7;

S41: the FCS first takes the Flash file path and the Flash animation parameters in the request as the keywords to find whether the FST has the corresponding code stream file or not, if the corresponding FS is found, it is to proceed to the step S42, otherwise it is to proceed to step S43;

S42: the FCS updates the recorded inquiry time, the number of inquiries and so on corresponding to the FST keywords (parameter and the file path), and then it is to proceed to step S6;

S43: the FCS finds whether it stores the Flash file in the request or not, if no, it is to proceed to step S7, otherwise, it is to proceed to the step S44;

S44: FCS performs the audio to video conversion on the requested Flash file, and pushes the converted code stream data to the MS in real time;

specifically, the FCS first sends the MS a code stream pushing ID, and converts the Flash file to the code stream data based on the corresponding parameters, and carries the code stream push ID when pushing the code stream data to the MS, the MS identifies the code stream data corresponding to this Flash request according to the ID.

After the step S44, the FCS also writes the code stream data for which the conversion is performed into the code stream file, and stores the code stream file, that is, adds a FS in the FST, the recorded item comprises the Flash file path, the code stream file path, the requested Flash animation parameters, the conversion time, the inquiry time, the number of inquiries, and so on;

In the step S44, if the FCS receives the playing stop command sent by the MS in the code stream pushing process, it stops pushing the code stream to the MS, but still continues to completely convert the Flash file into a code stream file and stores the file.

S51: the FCS first finds whether the Flash file in the request is stored in the storage module or not, if not, it is to proceed to step S7, otherwise, it is to proceed to the step S52;

S52: the FCS performs the audio to video conversion on the requested Flash file, and pushes the converted code stream data to the MS in real time;

specifically, the FCS sends a code stream pushing ID to the MS, and converts the requested Flash file into code stream data, and carries the code stream pushing ID when pushing the code stream data to the MS.

In the step S52, if the FCS receives the playing stop command sent by the MS in the code stream pushing process, it stops pushing the code stream to the MS.

S6: the FCS sends a response carrying the code stream file path to the MS;

S7: the FCS sends a response indicating that the Flash file is not found to the MS.

When the dynamic Flash file in the Flash code stream corresponding item is requested, the FCS also periodically deletes the FS whose number of inquiries is fewer than the default value or deletes one or more FSs whose number of inquiries is of last in a sequence.

The FCS maintains each code stream pushing thread of the MS, and the thread cyclically detects the MS code stream link list termly, if new code stream data belonging to the MS are found, sends the code stream data to the corresponding MS. The code streams of the same MS form a code stream link list.

In summary, the system for generating Flash-based media stream described in the certain embodiment of the invention can easily provide the media server or other system with high-quality audio and video sources to enhance the user experience.

It should be understood that, the company names and the illustration of specific steps are relatively specific, while they cannot be considered to limit the patent protection scope of the present invention, the patent protection scope of the present invention should be based on the appended claims.

INDUSTRIAL APPLICABILITY

The present invention provides a system and method for playing Flash-based media, the operators can provide users with video service-based customer service system or other applications, since the Flash design is simple and mature, the problem that the video sources are scarce in the conventional video service system is solved and the problem that dynamic video perception in the conventional video service system is poor is solved. Through the deployment of the system, the operators can reduce their operating costs, thus the method has good promotion prospects. With this solution, the Flash animation can be converted and played to the terminal in real time, thus improving the user experience.

What is claimed is:

1. A method for playing Flash-based media, comprising:
when a Flash conversion server receives a Flash Play request sent by a media server, the Flash conversion server parsing the request to obtain a type of the request;
when the type of Flash Play request is a dynamic Flash request or a real-time Flash request, the Flash conversion server converting a Flash file corresponding to the request into code stream data;
sending, by the Flash conversion server, a code stream pushing identifier to said media server;
pushing, by the Flash conversion server, the code stream data carrying the code stream pushing identifier to the media server;
the media server identifying the code stream data corresponding to the current request according to the code stream pushing identifier carried in the code stream data and playing the received and identified code stream data to a display terminal;
wherein converting a Flash file corresponding to the request into code stream data comprises:
during a playing process of the flash file, capturing scenes to generate images, sampling sound data of a Flash player to generate audio data, generating audio and video code streams in real time with the audio data and images.

2. The method of claim 1, comprising:
when the type of the Flash play request is a dynamic Flash request, if the Flash conversion server does not store the code stream file corresponding to the Flash file that is requested to be played but stores said Flash file, the Flash conversion server converting the Flash file into the code stream data and pushing the code stream data to the media server.

3. The method of claim 2, wherein, the method also comprises:
after the Flash file conversion is completed, the Flash conversion server also generating a code stream file with all the code stream data corresponding to the Flash file and storing the code stream file, and adding a Flash code stream corresponding item in a stored Flash code stream conversion corresponding table, wherein the Flash code stream corresponding item comprises a Flash file path, a code stream file path, requested Flash animation parameters, a conversion time, an inquiry time, and a number of inquiries.

4. The method of claim 3, further comprising:
when a dynamic Flash file in the Flash code stream corresponding item is requested, the Flash conversion server updating the inquiry time and the number of inquiries of the Flash code stream corresponding item, and periodically deleting a Flash code stream corresponding item whose number of inquiries is fewer than a default value or deleting one or more of Flash code stream corresponding items whose number of inquiries is of last in a sequence.

5. The method of claim 1, wherein, the method also comprises:
when the type of the Flash Play request is a real-time Flash request, if the Flash conversion server stores the Flash file, the Flash conversion server converting the Flash file to code stream data and pushing the code stream data to the media server.

6. The method of claim 1, further comprising:
when the type of the Flash Play request is a dynamic Flash request, the Flash Play request comprises the Flash file path and the Flash animation parameters;
according to the Flash file path and the Flash animation parameters in the request, said Flash conversion server first finding whether a corresponding code stream file exists in the Flash code stream conversion corresponding table or not, if yes, returning the code stream file path to the media server, and said media server obtaining the corresponding code stream file according to the code stream file path and playing the corresponding code stream file to the terminal.

* * * * *